(12) United States Patent
Hong

(10) Patent No.: US 11,631,931 B2
(45) Date of Patent: Apr. 18, 2023

(54) CONNECTING COMPONENT WITH BUILT-IN RADIO FREQUENCY IDENTIFICATION ELEMENT

(71) Applicant: YOKE INDUSTRIAL CORP., Taichung (TW)

(72) Inventor: Rong-Der Hong, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 57 days.

(21) Appl. No.: 17/313,522

(22) Filed: May 6, 2021

(65) Prior Publication Data

US 2021/0359391 A1 Nov. 18, 2021

(30) Foreign Application Priority Data

May 12, 2020 (TW) .................................. 109205777

(51) Int. Cl.
*G06K 7/10* (2006.01)
*H01Q 1/22* (2006.01)
*H04B 5/00* (2006.01)

(52) U.S. Cl.
CPC ....... *H01Q 1/2208* (2013.01); *G06K 7/10108* (2013.01); *H04B 5/0062* (2013.01)

(58) Field of Classification Search
CPC ............. H01Q 1/2208; G06K 7/10108; G06K 19/041; G06K 19/045; G06K 19/07758;
(Continued)

(56) References Cited

U.S. PATENT DOCUMENTS 7,412,898 B1 * 8/2008 Smith .................... F16B 31/025
73/761
8,584,957 B2 * 11/2013 Zhu ......................... F16B 31/02
73/761
(Continued)

FOREIGN PATENT DOCUMENTS

DE 19917222 A1 11/2000
DE 202011000794 U1 6/2011
(Continued)

OTHER PUBLICATIONS

Search report for EP2117357.7, dated Oct. 13, 2021, Total of 7 pages.
(Continued)

*Primary Examiner* — Seung H Lee
(74) *Attorney, Agent, or Firm* — Apex Juris, PLLC; Hilde Coeckx; Tracy Heims

(57) ABSTRACT

A connecting component with built-in radio frequency identification element which includes a main body and a radio frequency identification element is provided. The main body has a cylindrical body part and a head, wherein the body part has a connecting end and a free end; the head is connected to the connecting end, and the maximum outer diameter thereof is greater than an outer diameter of the body part; the head has an accommodating hole, and an opening of the accommodating hole is formed at a top of the head; the radio frequency identification element can be inserted into the accommodating hole. When the connecting component is used to fixedly connect the rigid object, the radio frequency electronic component provides a space to store database; with the radio frequency identification reader, industry can read the data at any time during the inspection or the maintenance stages, which improves the convenience of obtaining data and the efficiency of operation.

5 Claims, 14 Drawing Sheets

(58) Field of Classification Search
CPC ...... H04B 5/0062; F16B 1/0071; F16B 19/06; F16B 45/023; B66C 1/10
See application file for complete search history.

(56) References Cited

U.S. PATENT DOCUMENTS

| | | | |
|---|---|---|---|
| 8,683,869 B2 * | 4/2014 | Herley | F16B 31/02 73/761 |
| 2018/0223891 A1 * | 8/2018 | White | G01K 1/024 |
| 2019/0244071 A1 * | 8/2019 | Grove | G06K 19/07771 |

FOREIGN PATENT DOCUMENTS

| | | |
|---|---|---|
| EP | 1864939 A1 | 12/2007 |
| JP | 2001330014 A | 11/2001 |
| WO | 2018039153 A1 | 3/2018 |
| WO | 2019140292 A1 | 7/2019 |

OTHER PUBLICATIONS

English abstract for DE19917222, total of 1 page.
English abstract for DE202011000794, total of 1 page.
English abstract for JP2001330014, total of 1 page.

* cited by examiner

CONNECTING COMPONENT WITH BUILT-IN RADIO FREQUENCY IDENTIFICATION ELEMENT

BACKGROUND OF THE INVENTION

Technical Field

The present invention relates generally to a connecting component, and more particularly to a connecting component with built-in radio frequency identification element.

Description of Related Art

In a mechanism or device constructed in rigid units, small connecting components are often used to connect or fix the units. To ensure the smooth operation of the mechanism or the safety for use of the device, operators must regularly inspect and repair the units of the mechanism or device. Specifically, the operators will first establish the basic information of each unit, such as model number, size, mechanical properties, working load limit, and other related data into a database. In the subsequent inspection stage, the operators must find out the basic information of the object to be tested first, and then perform multiple tests on the object manually. After the inspection is completed, the operators must record the inspection results in the database for reference in the next inspection. Such inspection results help the operators to understand the maintenance state as well as the residual life of the units so as to replace them as soon as possible to ensure the safety for use.

Take a metal safety hook as an example, which is applied to high-altitude hanging operation, in order to ensure that each safety hook is safe and flawless, the operator registers inspection information first for all security hooks manually, and makes the security hooks rollout after checking that each security hook meets the registered information and passing the inspection test. Afterward, when performing maintenance procedure, the service person has to check the detailed database of the safety hooks first to confirm their service life and maintenance history and other information so as to decide whether to replace the safety hooks. However, whether in the inspection stage or the maintenance stage, the inspection process and equipment are complicated; moreover, the service person must search the database of each safety hook, which costs a lot of time. Such conventional procedure may cause low operation efficiency and uncertainty of the database due to the omission in the process of manually updating the content of the database.

BRIEF SUMMARY OF THE INVENTION

In view of the above, the primary objective of the present invention is to provide a connecting component with built-in radio frequency identification element, which connects a mechanism or device, and contains information about the corresponding mechanism or device for quick search easily.

The present invention provides a connecting component with built-in radio frequency identification element, which is provided to be connected to at least one object, wherein the object has a perforation. The connecting component includes a main body and a radio frequency identification element. The main body has a cylindrical body part and a head, wherein the body part has a connecting end and a free end; the head is connected to the connecting end, and the maximum outer diameter thereof us greater than the one of the body part; the head has an accommodating hole whose opening is formed at the top of the head; the radio frequency identification element includes a plastic carrier and a radio frequency electronic component which is embedded into the plastic carrier, wherein the plastic carrier is inserted into the accommodating hole.

By such design, the body part of the connecting component can pass through the perforation of the object, which makes the free end protrude from the perforation; by a punching device, the free end which is exposed is punched, so that the free end is formed into an enlarged part with a larger outer diameter than outer diameters of the other parts of the body part by material extrusion, and the enlarged part and the head are respectively located at two ends of the perforation of the object.

The effect of the present invention is that, the connecting component with built-in radio frequency identification element provides a database storage space for a rigid unit which it is applied to. Moreover, with the radio frequency identification reader, the industry can easily read the data stored in the built-in radio frequency electronic component rather than carrying too many objects, such as heavy data booklets. In this way, the convenience of obtaining data and the efficiency of operation are improved, and the recorded data is more accurate than previous manual records.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
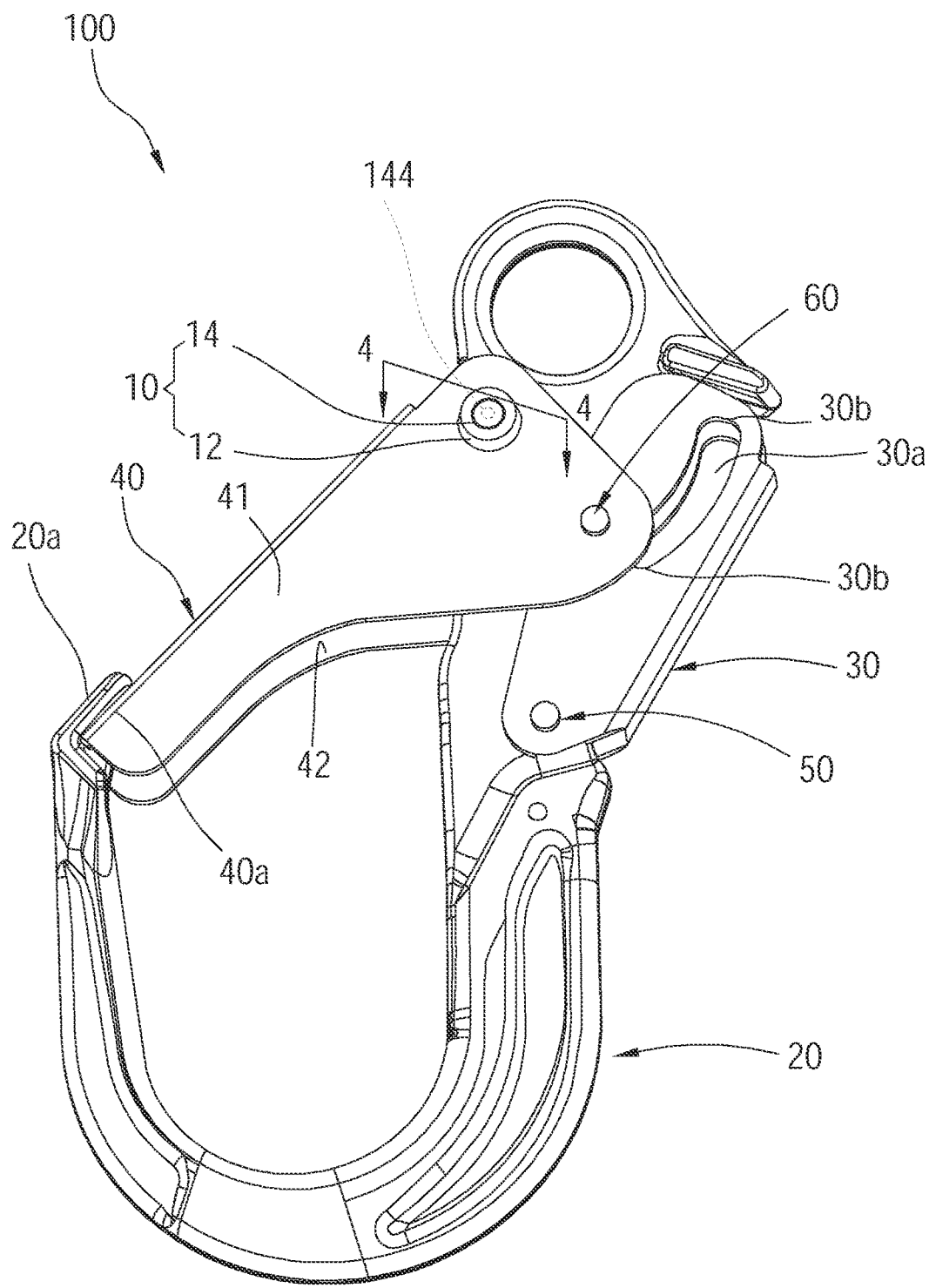
FIG. 1 is a perspective view of the connecting component of the first embodiment of the present invention which is applied to the safety hook.

As shown in FIG. 1, a metal unit includes a first embodiment of the present invention, a connecting component with built-in radio frequency identification element 10, wherein the metal unit is a safety hook 100. The safety hook 100 is applied to high-altitude hanging operation. The safety hook 100 in this embodiment includes a hook body 20, a switch 30, and a lock 40.

The hook body 20 has a recess 20a at an end thereof. An end of the switch 30 is connected to the hook body 20 with a pivot which is a rivet 50. The switch 30 has a recess 30a as a track for the lock 40. The recess 30a has two close-ends 30b. The lock 40 includes a first plate 41 and a second plate 42. An and of the lock 40 is connected to the hook body 20 by the connecting component 10 that passes through the first plate 41, the hook body 20, and the second plate 42;

moreover, the lock 40 is able to pivot on the hook body 20. The other end of the lock 40 is connected to the switch 30 by a bolt 60 which passes through the recess 30a of the switch 30, wherein the bolt 60 is movable between the two close-ends 30b which the bolt 60 can abut against, and thus the bolt 60 decides the pivotable range of the lock 40. When the bolt 60 abut against the close-end 30b on the upper side of the recess 30a, an abutting portion 40a of the lock 40 abuts against the recess 20a of the hook body 20, which makes the hook body 20 and the lock 40 form an enclosed space for hanging objects (e.g., for high-altitude hanging operation), wherein the enclosed space can prevent the hanging objects from falling off.

Figure 2:
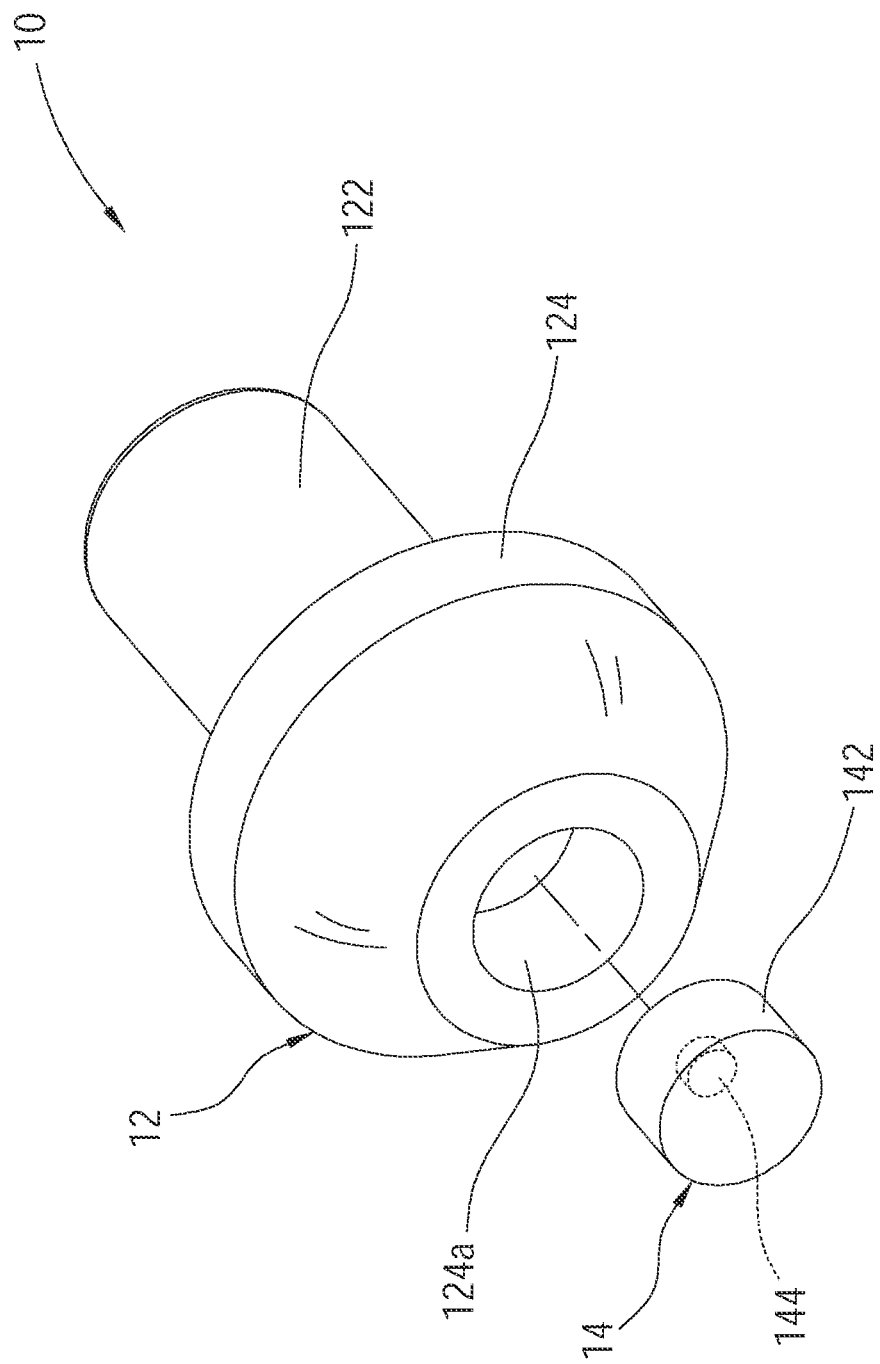
FIG. 2 is an exploded view of the connecting component in FIG. 1.
Figure 3:
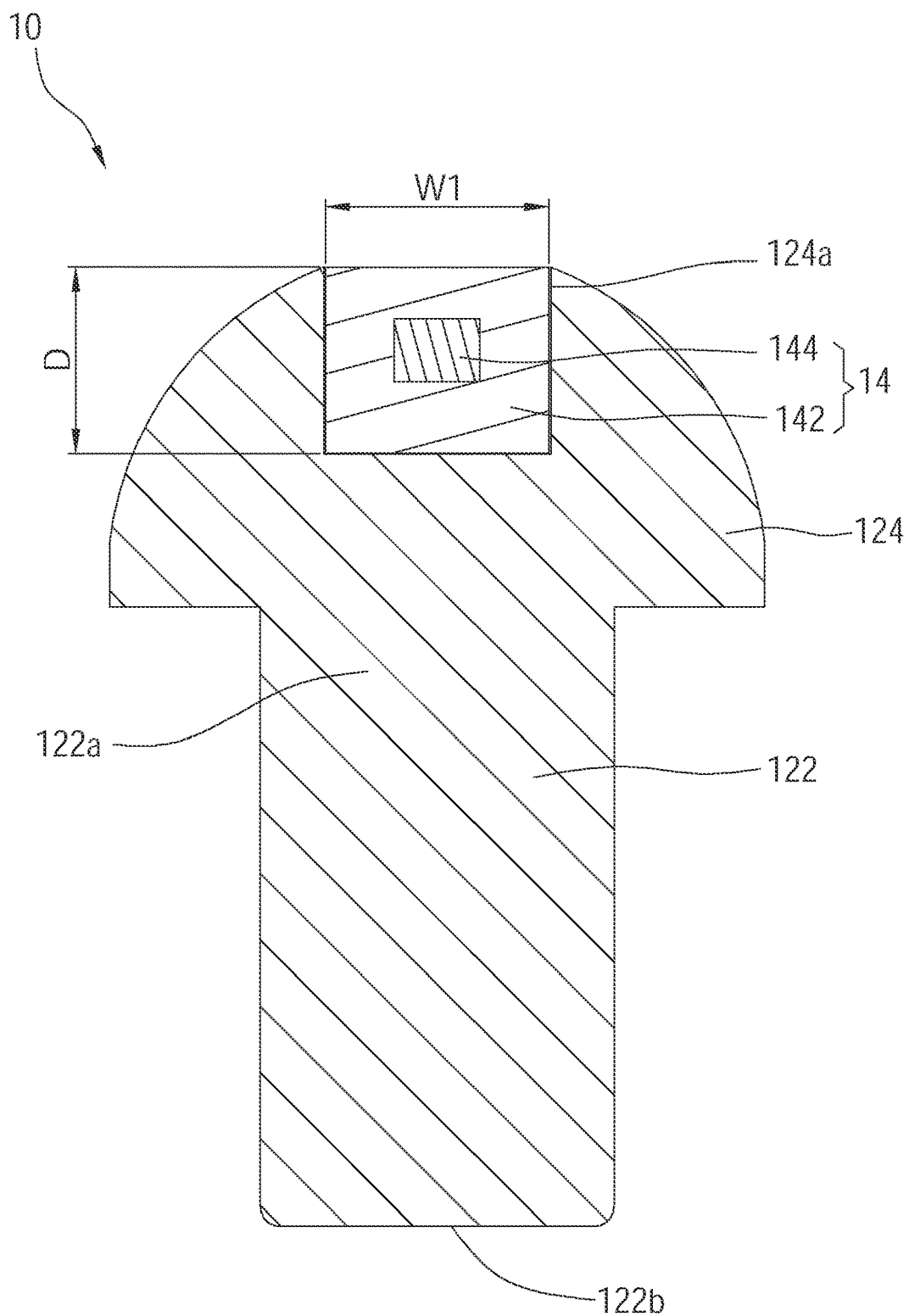
FIG. 3 is a sectional view of the connecting component in FIG. 2.
Figure 4:
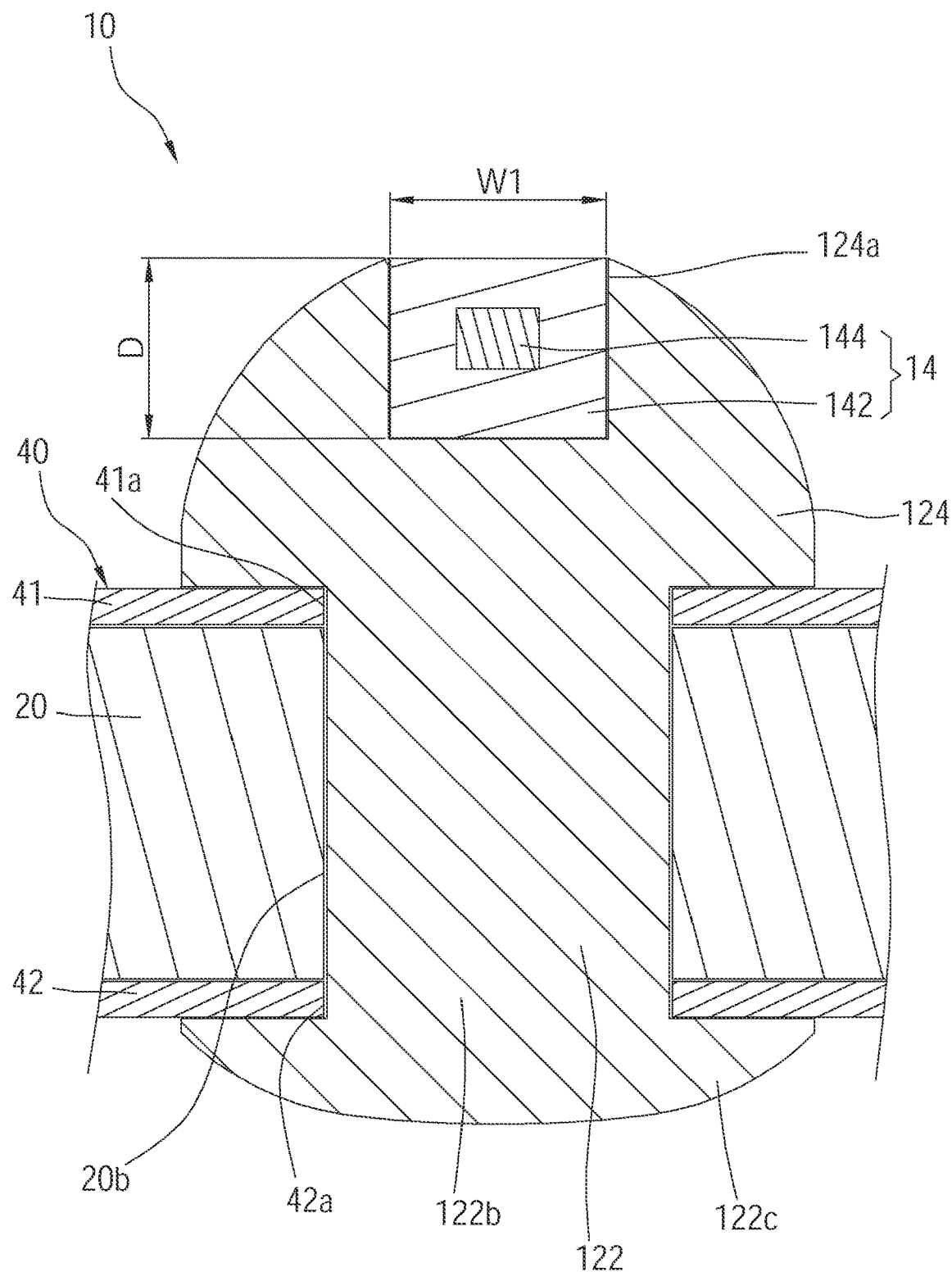
FIG. 4 is a sectional view along the 4-4 line in FIG. 1.

As depicted in FIG. 2 and FIG. 3, the connecting component with built-in radio frequency identification element 10 includes a main body 12 and a radio frequency identification element 14. In this embodiment, the main body 12 is a rivet which is made of metal. The main body 12 has a cylindrical body part 122 and a head 124. Furthermore, the body part 122 has a connecting end 122a and a free end 122b, wherein the head 124 is connected to the connecting end 122a, and the maximum outer diameter of the head 124 is greater than the outer diameter of the body part 122. The head 124 has an accommodating hole 124a which is a round hole, wherein the opening of the accommodating hole 124a is formed at the top of the head 124. However, the accommodating hole 124a is not limited to a round hole, and can be a square-shaped or other polygonal-shaped holes. The accommodating hole 124a has a hole width W1 and a hole depth D. In this invention, the hole width W1 is between 5 mm and 11 mm, and the hole depth D is between 3 mm and 11 mm. In this embodiment, the hole width W1 is 6 mm, and the hole depth D is 4 mm.

The radio frequency identification element 14 includes a plastic carrier 142 and a radio frequency electronic component 144. The plastic carrier 142 is inserted into the accommodating hole 124a of the head 124, and will not easily move or rotate relative to the accommodating hole 124a. The radio frequency electronic component 144 is embedded in the plastic carrier 142; there is a sufficient distance from the hole wall of the accommodating hole 124a to the radio frequency electronic component 144 by the plastic carrier 142, which protects the radio frequency electronic component 144. The radio frequency electronic component 144 is provided to store detailed database of the hook body 20, the switch 30, and the lock 40 of the safety hook 100; the content of the database can include information such as the model number of the hook body 20, the mechanical properties of the switch 30, the size of the switch 30, and the date of production of the lock 40, but not limited to these information. The abovementioned information stored in the radio frequency electronic component 144 can be read by a radio frequency identification reader. Furthermore, the information in radio frequency electronic component 144 can be rewritten or added with other data such as the recent maintenance date or service life of the safety hook 100. The operator can make the radio frequency identification reader close to the radio frequency electronic component 144 to receive the database in the radio frequency electronic component 144, and the received database can be shown on a screen of the radio frequency identification reader. Therefore, the operator can view the detailed database of the safety hook 100 easily and quickly, and the data in the database can be modified or added as required.

The connecting component with built-in radio frequency identification element in this invention is able to be connected to at least one object which has a perforation. The body part of said connecting component can passes through the perforation of the object so that the free end of the body part protrudes from the perforation. Afterward, a punching device is used to punch the exposed free end, which makes the free end be formed into an enlarged part with a larger outer diameter than outer diameters of the other parts of the body part by material extrusion, and the enlarged part and the head are respectively located at two ends of the perforation of the object. In this embodiment, the abovementioned at least one object is composed of the hook body 20 and the lock 40; the hook body 20 has a hole 20b; the first plate 41 of the lock 40 has a hole 41a; the second plate 42 has a hole 42a. When the body part 122 passes through the hole 41a of the first plate 41, the hole 42a of the second plate 42 as well as the hole 20b of the hook body 20, and moreover, the punching device applies an external force to the free end 122b of the body part 122, the partial free end 122b of the body part 122 would be deformed by the external force to form the enlarged part 122c with the larger outer diameter than outer diameters of the other parts of the body part 122. Thereby, the enlarged part 122c and the head 124 clamp the first plate 41 and second plate 42 front and back respectively in order to firmly connect the hook body 20 and the lock 40. In addition, the aforementioned object is not limited to be composed of the hook body 20 and the lock 40, and also can be made up of the hook body 20 and the switch 30, or be made up of the switch 30 and the lock 40, in this case, the connecting component is the rivet 50 or the bolt 60, which show in FIG. 1.

The connecting component 10 with the radio frequency electronic component 144 has the following advantages.

First, the structural strength of the metal safety hook 100 would not be affected. If manufacturers would like to add the radio frequency electronic component to the conventional metal safety hook, they must drill a hole in the safety hook to insert the radio frequency electronic component into the hole, which reduces the structural strength of the safety hook and add additional manufacturing procedures. By contrast, the present invention uses the existing units of the safety hook to combine the radio frequency electronic component 144 with the rivet without affecting the function of the safety hook, which would not reduce the structural strength of the safety hook.

Second, the time for searching data is shortened, which improves work efficiency. The operators only need to make the built-in radio frequency identification reader close to the radio frequency electronic component 144 to get all the information they need. In this way, the operators can quickly perform inspections or maintenance, and add data to the radio frequency electronic component 144 as needed.

Third, accuracy of the content in the database is increased. In the case of handwritten records for data content, for example, the date of regular maintenance needs to be recorded each time for follow-up tracking. However, the data by such recording method is easy to be forgotten or lost due to human negligence. By contrast, in the case of recording by the radio frequency electronic component 144, the radio frequency electronic component 144 can automatically record the date every time when the database is called, wherein the date of maintenance is clearly recorded.

Fourth, the plastic carrier 142 of the radio frequency identification element 14 helps signal transmission. The radio frequency electronic component 144 is wrapped in the plastic carrier 142 made of plastic so that the radio frequency electronic component 144 can be applied to the main body 12 made of metal. The plastic carrier 142 facilitates the signal transmission between the built-in radio frequency identification reader and the built-in radio frequency electronic component 144, and prevents the main body 12 from shielding the signal.

Figure 5:
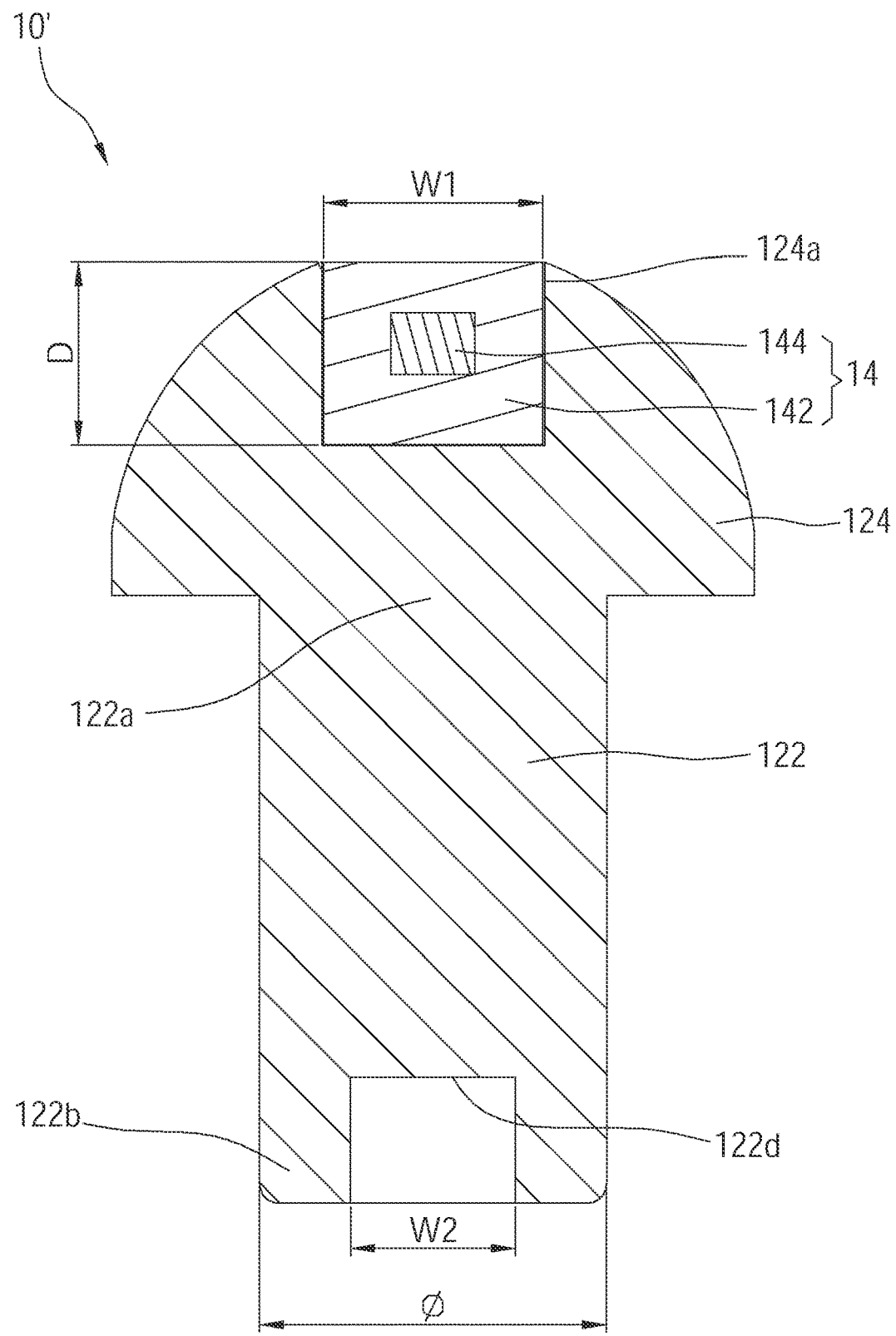
FIG. 5 is a sectional view of the connecting component of the second embodiment of the present invention.
Figure 6:
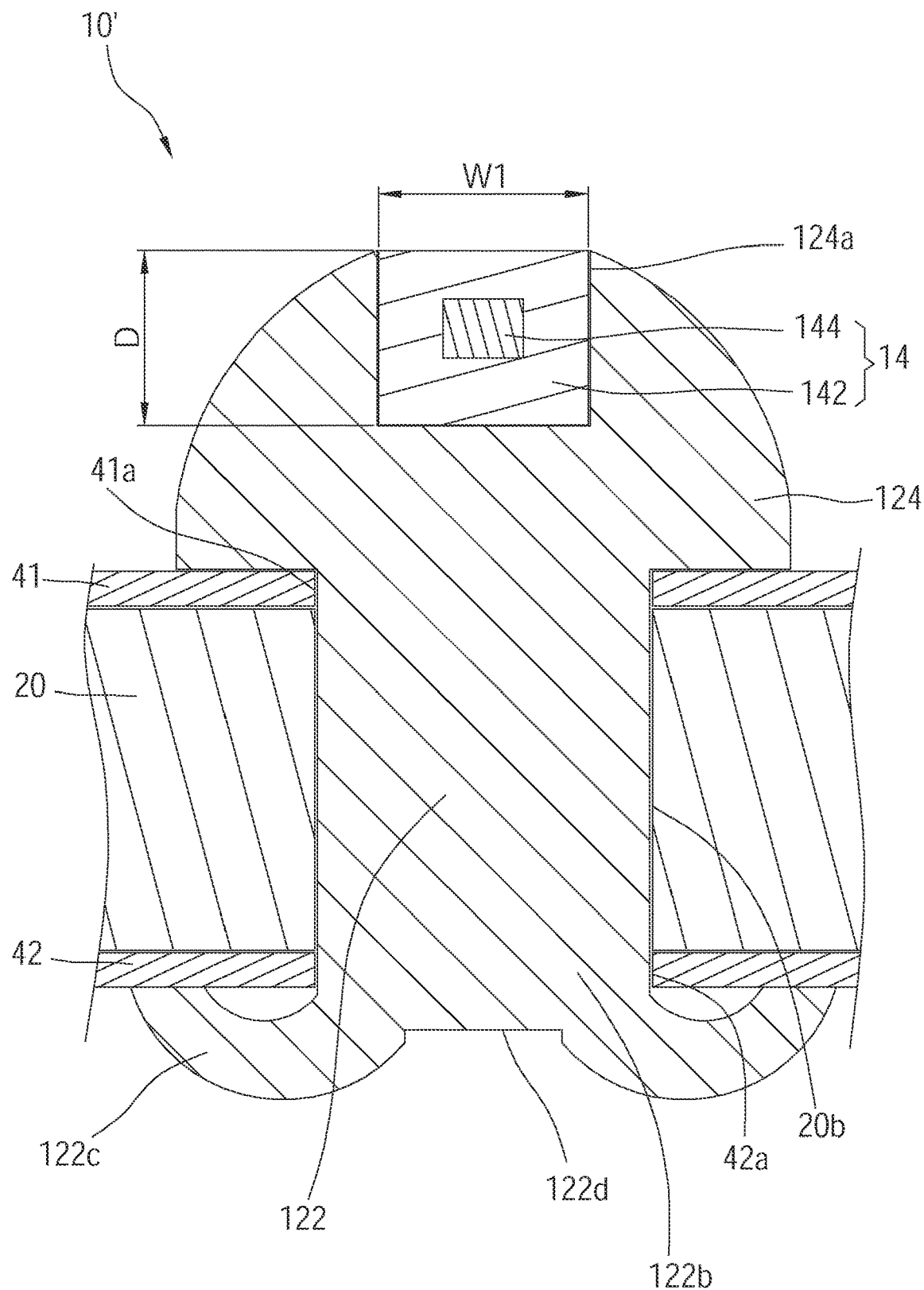
FIG. 6 is a partial sectional view of the connecting component in FIG. 5 which is applied to the safety hook.
Figure 7:
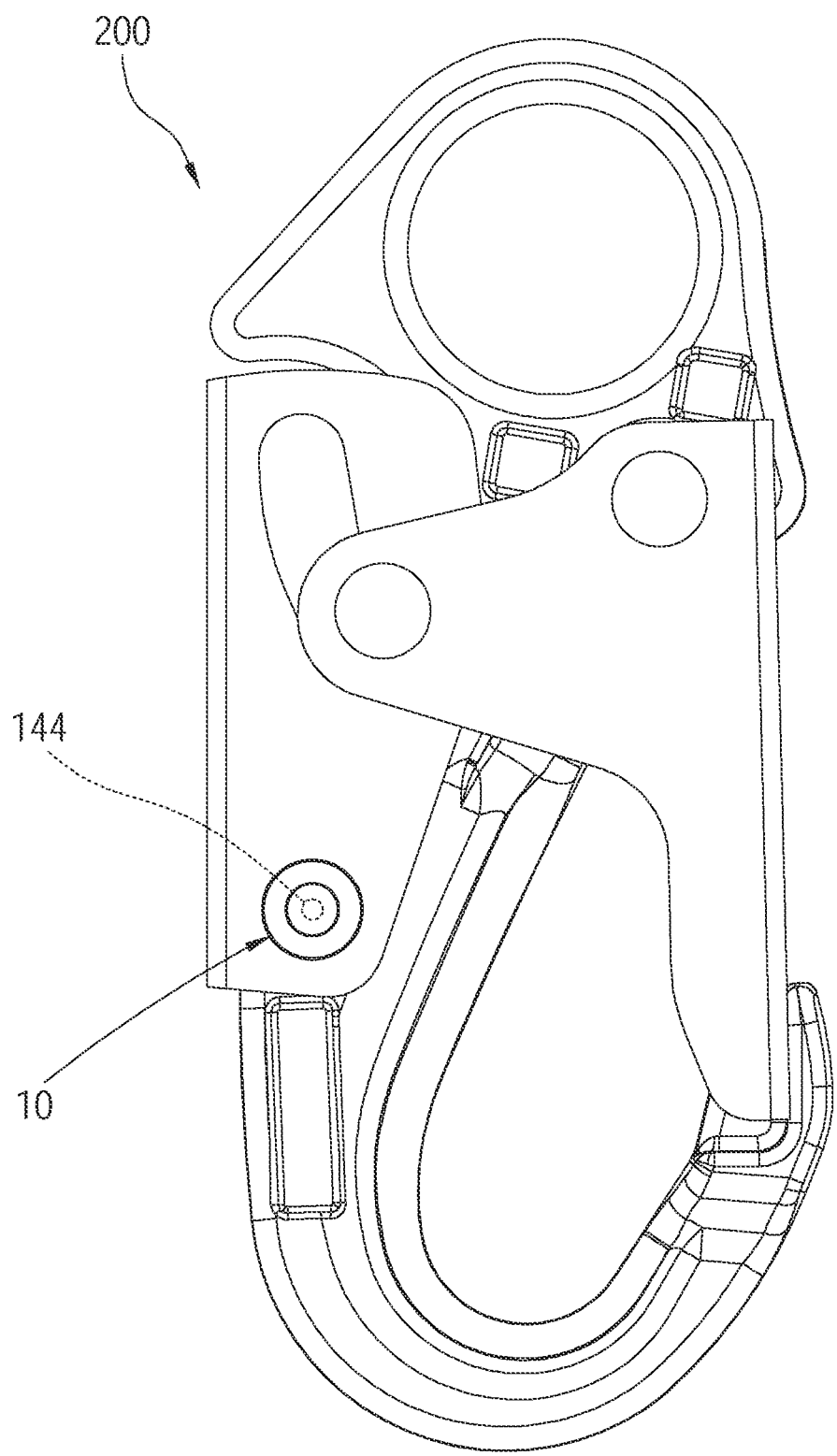
FIG. 7 to FIG. 13 are perspective views of the connecting components in different applications.

Besides, a second embodiment of the present invention, a connecting component 10', is provided, as shown in FIG. 5 and FIG. 6. The connecting component 10' and the connecting component 10 are rivets of the same shape and size. The difference is that, the free end 122b of the body part 122 of the connecting component 10' has a recess 122d formed from the end face thereof; the recess 122d is a circular recess, and the diameter of the recess 122d is the hole width W2. In the present invention, the ratio of the diameter Φ of the body part 122 to the hole width W2 of the recess 122d is between 1.1 and 1.4. However, in this embodiment, the ratio of the diameter Φ of the body part 122 to the hole width W2 of the recess 122d is 1.25. When the free end 122b of the body part 122 protrudes from the hole 41a of the first plate 41, the hole 42a of the second plate 42 as well as the hole 20b of the hook body 20, and moreover, the punching device applies an external force to the recess 122d, the wall of recess 122d will be forced to expand and deform to form the enlarged part 122c with a larger outer diameter than the outer diameters of the other parts of the body part 122. The enlarged part 122c and the head 124 are located at two ends of the lock 40, and clamp the first plate 41 and second plate 42 front and back respectively in order to firmly connect the hook body 20 and the lock 40.

Figure 8:
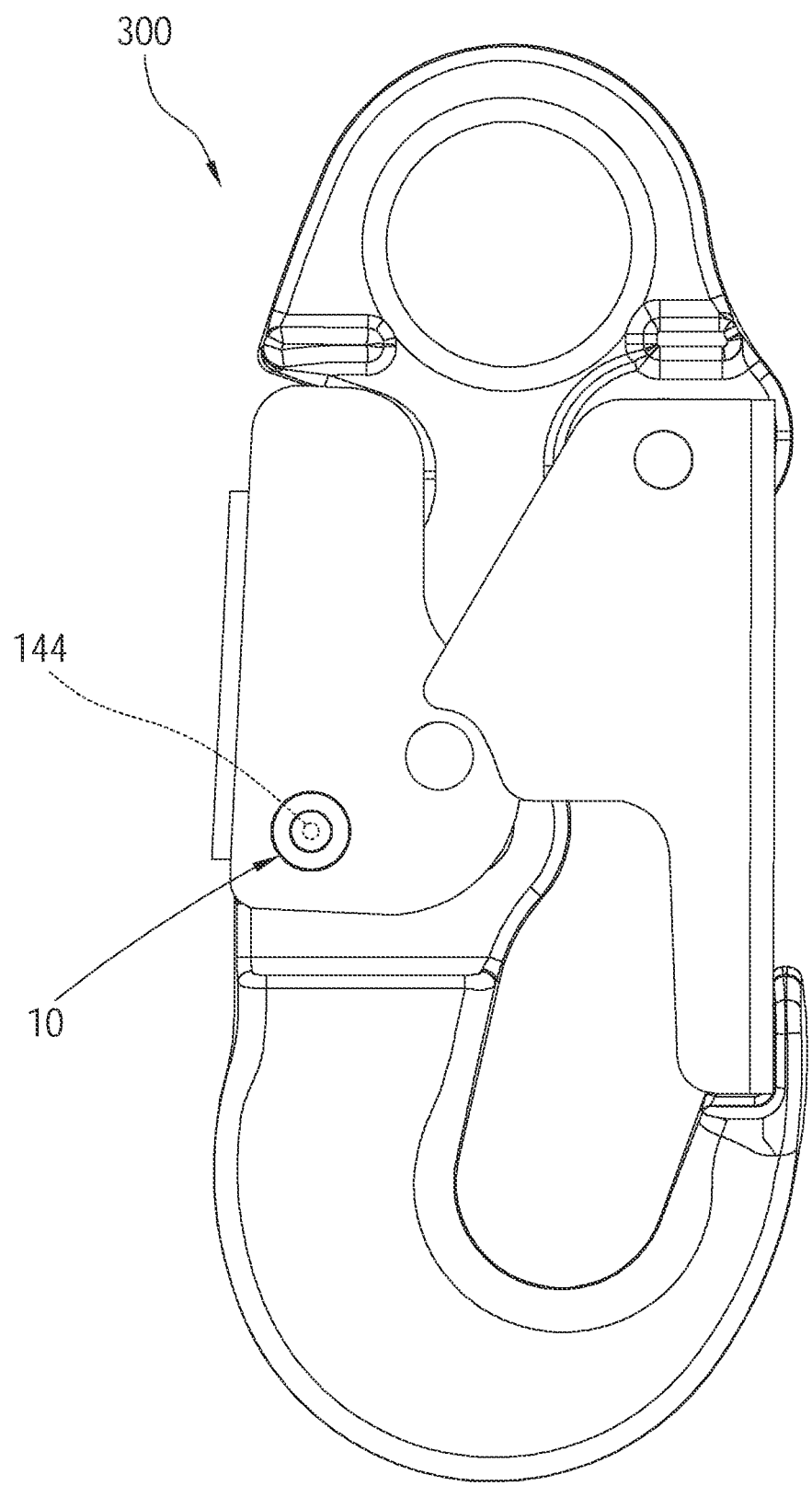
Figure 9:
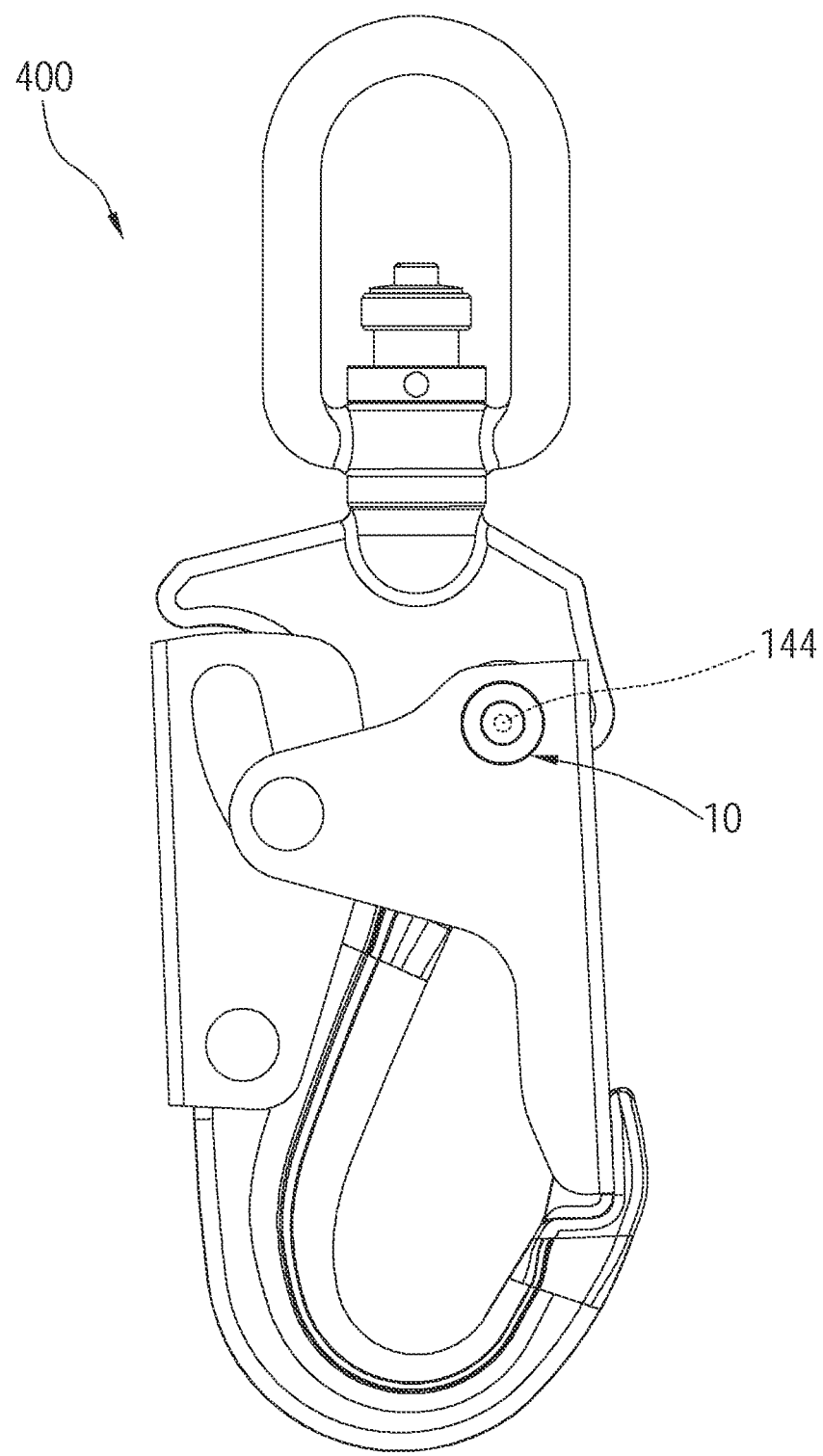
Figure 10:
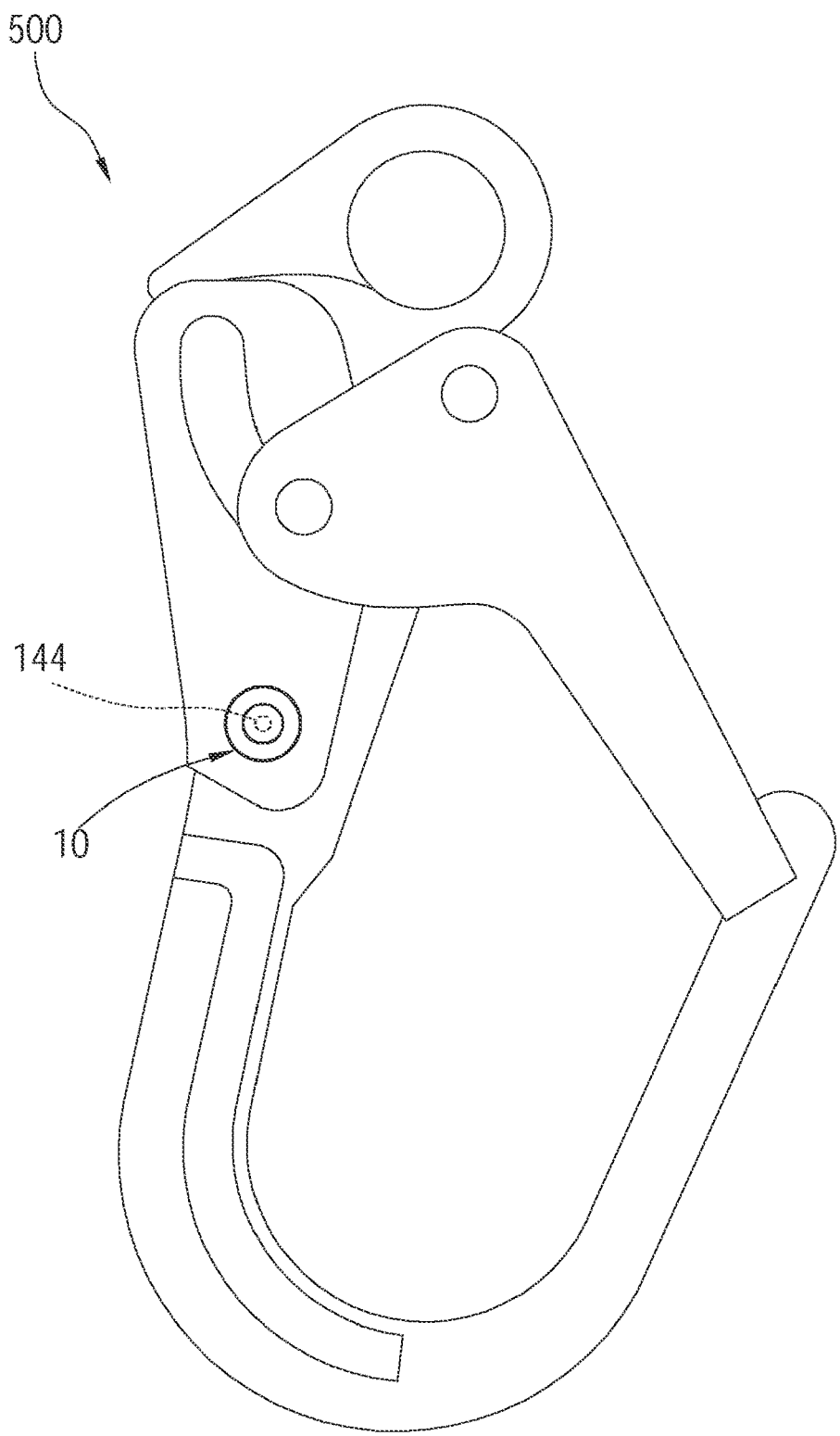
Figure 11:
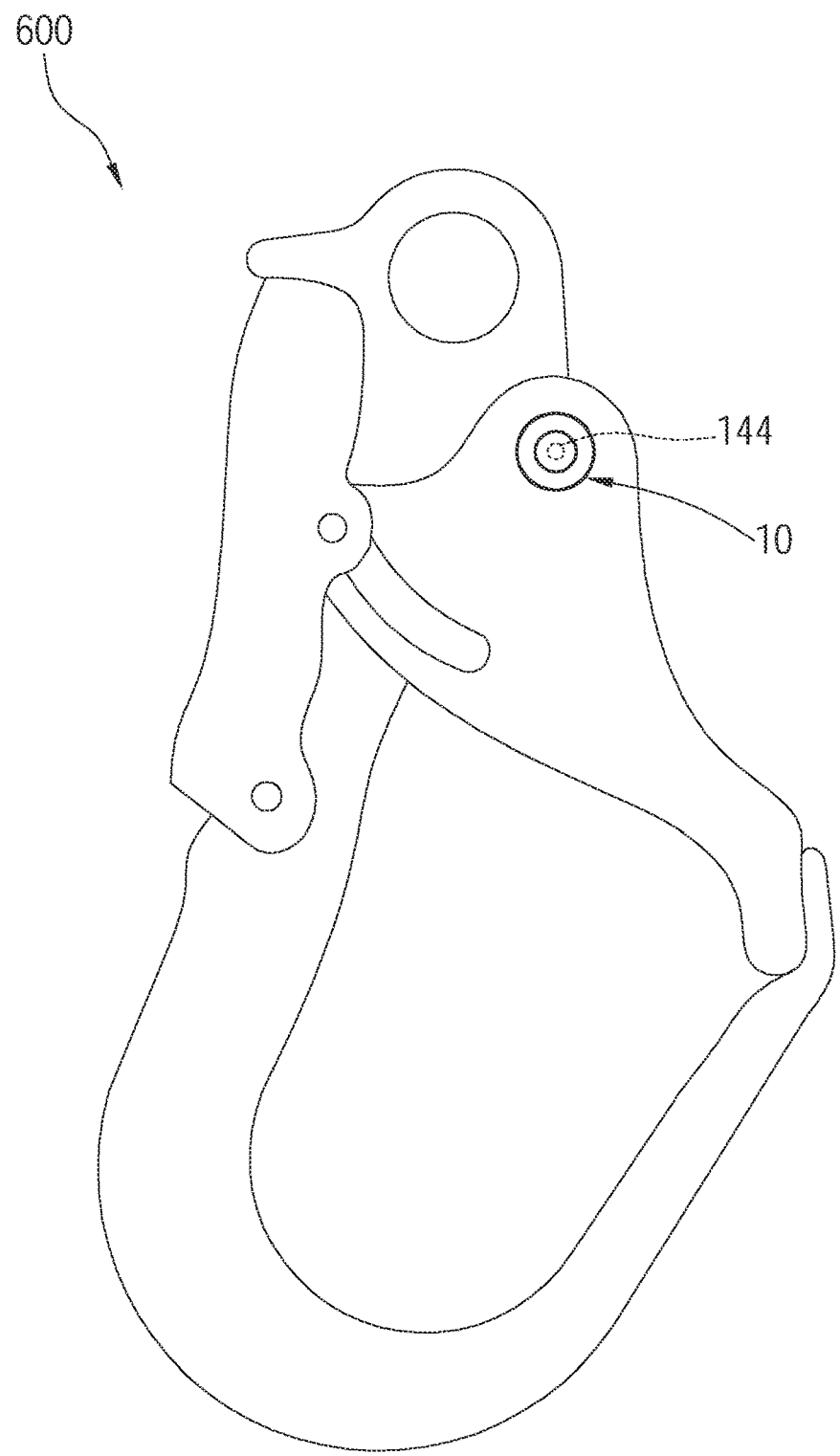

The connecting component with built-in radio frequency electronic component of the present invention can be applied to not only metal hook, e.g., the safety hook 100, but also other types of metal units. As illustrated in FIG. 7 to FIG. 11, FIG. 7 shows the connecting component 10 of the built-in radio frequency electronic component 144 is applied to a safety hook 200; FIG. 8 shows the connecting component 10 of the built-in radio frequency electronic component 144 is applied to a safety hook 300; FIG. 9 shows the connecting component 10 of the built-in radio frequency electronic component 144 is applied to a safety hook 400; FIG. 10 shows the connecting component 10 of the built-in radio frequency electronic component 144 is applied to a safety hook 500; FIG. 11 shows the connecting component 10 of the built-in radio frequency electronic component 144 is applied to a safety hook 600.

The above is the description of the application of the connecting component of the built-in radio frequency electronic component to safety hooks of different specifications. The following specifies other embodiments which applied to other applications rather than safety hook.

Figure 12:
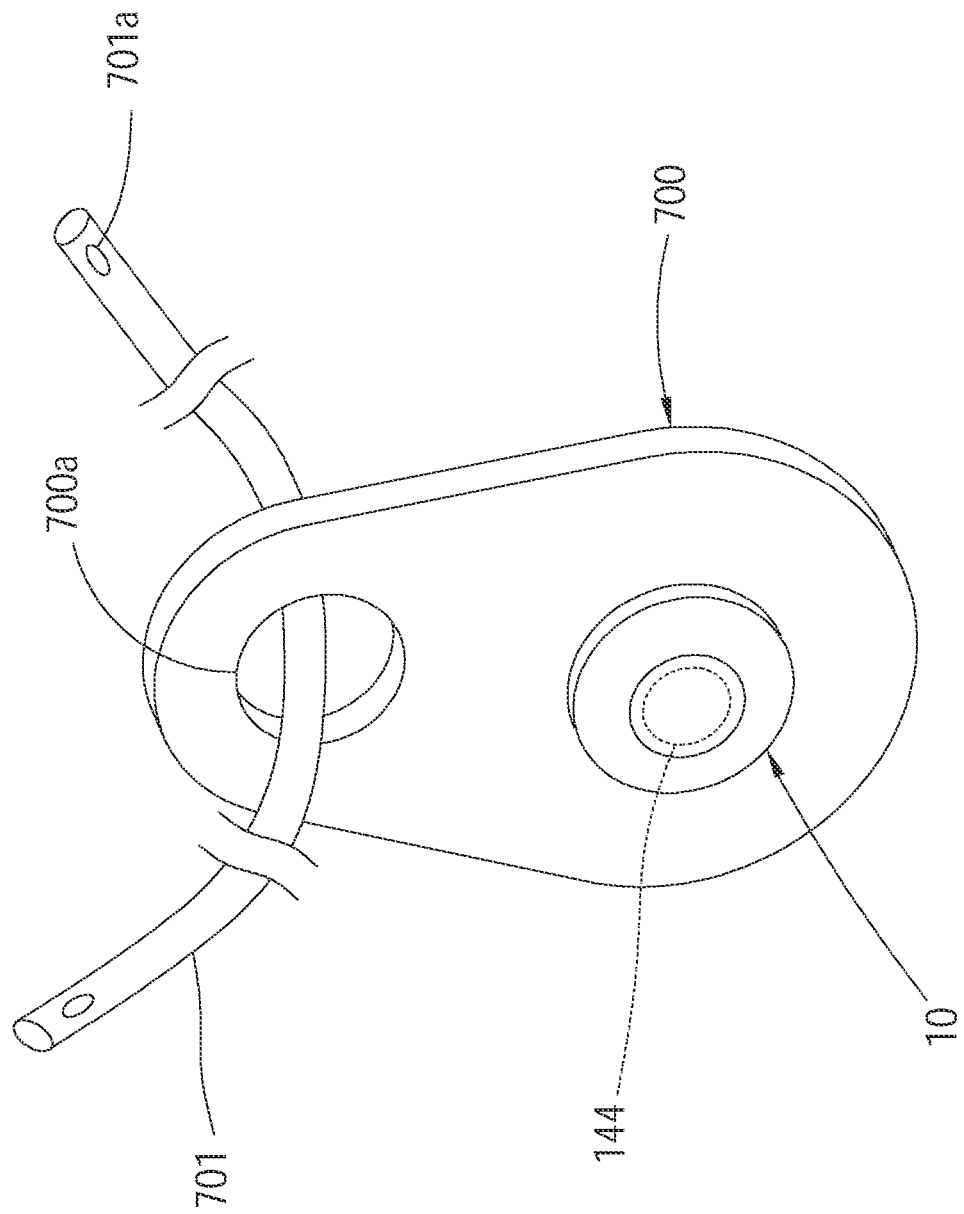

As shown in FIG. 12, the connecting component 10 of the built-in radio frequency electronic component 144 is applied to a hangtag 700. More specifically, the hangtag 700 has a hole 700a. A connecting line 701 passes through the hole 700a of the hangtag 700, and two ends of the connecting line 701 can be connected to each other to make the connecting line 701 form a loop, so that the hangtag 700 can attach to a specific object which includes but not limited to a metal safety hook. Such design will not destroy the structural strength of the specific object, and also have the function of radio frequency identification. Furthermore, each of the two ends of the connecting line 701 can has a perforation 701a, and a fixing member (not shown) would pass through the two perforations 701a to connect the two ends. Removing the fixing member can achieve the purpose of separating the two ends of the connecting line 701. Of course, the two ends of the connecting line 701 may not be separated after they are connected.

Figure 13:
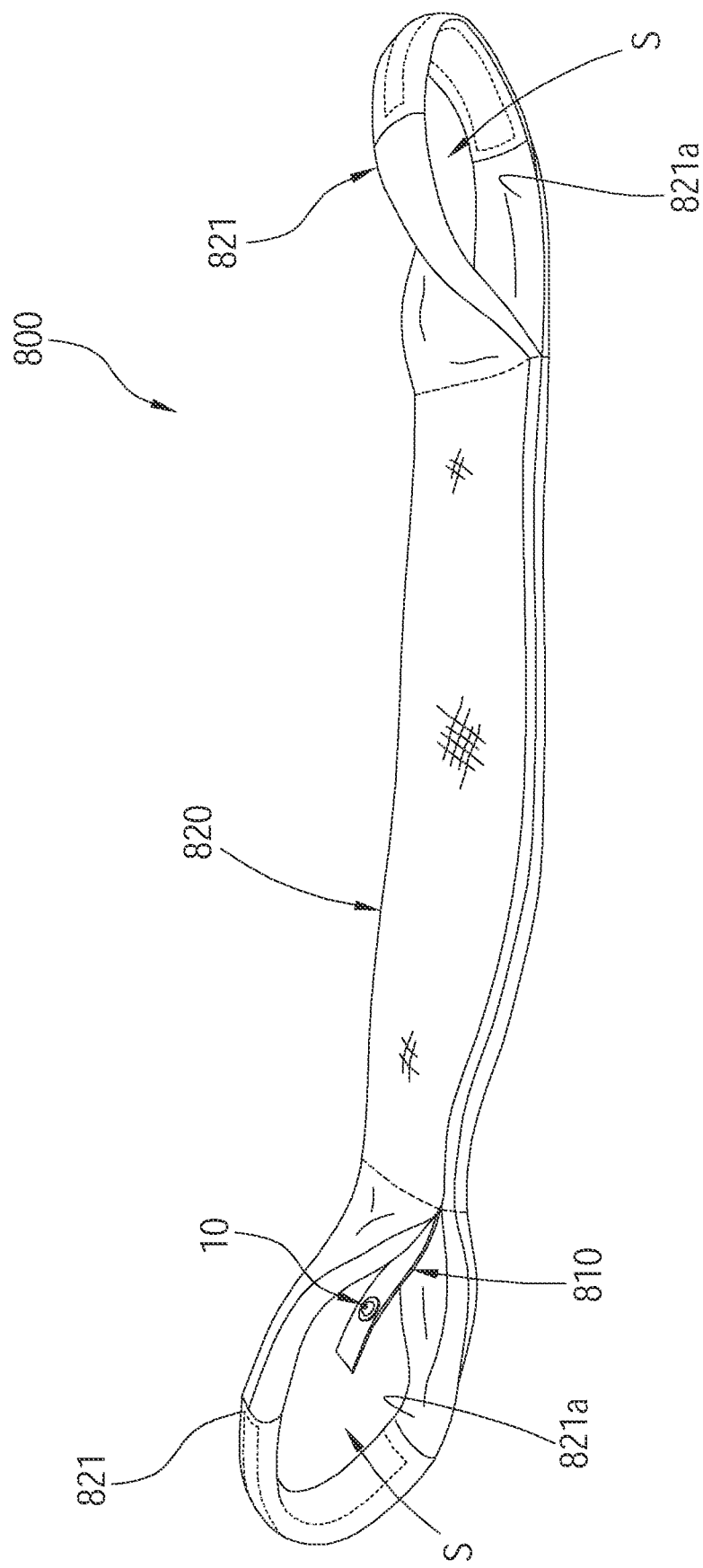
Figure 14:
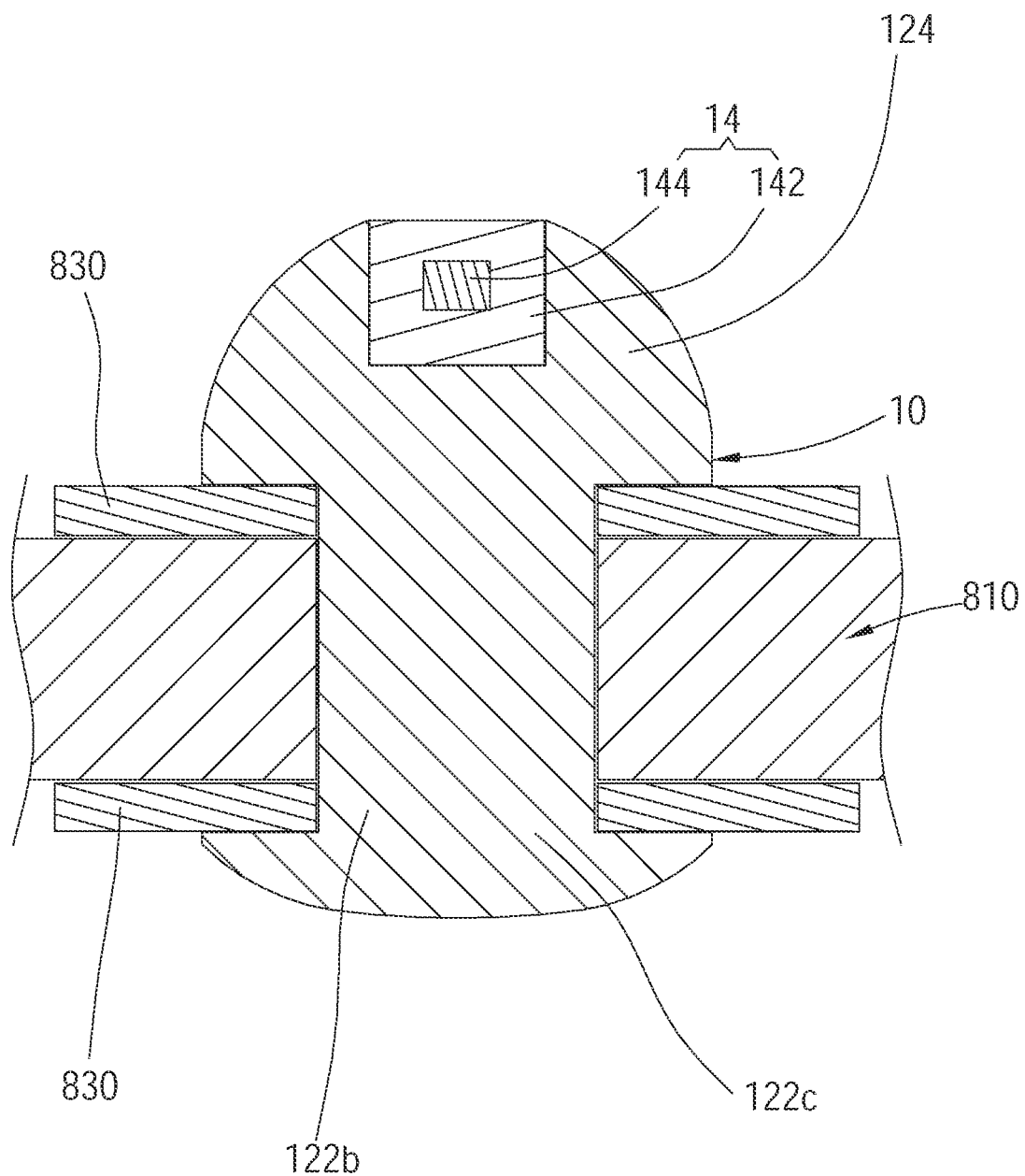
FIG. 14 is a partial sectional view of the connecting component in FIG. 13.

Additionally, as shown in FIG. 13 and FIG. 14, the connecting component 10 is applied to a safety sling 800 which includes a webbing strip 810 and a band main body 820. The band main body 820 has two terminal ends, and each of them has a ring 821. The webbing strip 810 is fixed to the ring 821 of the band main body 820 by one end thereof, so that a part of the webbing strip 810 is located in a hook space S which is formed by the inner ring surface 821a of one ring 821. The safety sling 800 further includes two gaskets 830. The free end 122b of the connecting component 10 passes through one gasket 830 and one end of the webbing strip 810 that is not connected to the band main body 820 first, and then passes through another gasket 830. Afterward, punch the free end 122b to force the free end 122b to be formed into the enlarged part 122c by material extrusion. In this way, the connecting component 10 can be fixed to the end of the webbing strip 810 that is not connected to the band main body 820. The abovementioned gasket 830 can prevent the surface of the webbing strip 810 from being improperly worn by the connecting component 10. Besides, such design makes the radio frequency electronic component 144 protected by the inner ring surface 821a. When the safety sling 800 hangs objects or multiple safety slings are stacked, the radio frequency electronic component 144 would not be damaged by friction with hanging objects or other safety slings.

It must be noted that the embodiments described above are only preferred embodiments of the present invention. All equivalent structures which employ the concepts disclosed in this specification and the appended claims should fall within the scope of the present invention.

What is claimed is:

1. A connecting component with built-in radio frequency identification element, which is provided to be connected to at least one object, wherein the object has a perforation; the connecting component comprising:

a main body which is made of metal and has a cylindrical body part and a head, wherein the body part has a connecting end and a free end; the head is connected to the connecting end, and the maximum outer diameter thereof is greater than an outer diameter of the body part; the head has an accommodating hole, and an opening of the accommodating hole is formed at a top of the head; and a radio frequency identification element which comprises a plastic carrier and a radio frequency electronic component which is entirely embedded into the plastic carrier, wherein the plastic carrier is inserted into the accommodating hole; and wherein the body part of the connecting component can pass through the perforation of the object, which makes the free end protrude from the perforation; and wherein the free end which is exposed is punchable by a punching device; when the free end is punched, the free end is formed into an enlarged part with a larger outer diameter than outer diameters of the other parts of the body part by material extrusion, and the enlarged part and the head are respectively located at two ends of the perforation of the object.

2. The connecting component of claim 1, wherein the accommodating hole has a hole width and a hole depth; the hole width is between 5 mm and 11 mm, and the hole depth is between 3 mm and 11 mm.

3. The connecting component of claim 1, wherein the free end of the body part has a recess formed from an end face thereof.

4. The connecting component of claim 3, wherein a ratio of a diameter of the body part to the hole width of the recess is between 1.1 and 1.4.

5. The connecting component of claim 1, wherein the object is a safety hook for high-altitude hanging operation; and wherein the safety hook comprises a hook body, a switch, and a lock.

\* \* \* \* \*